US010259496B2

(12) United States Patent
Talamonti et al.

(10) Patent No.: US 10,259,496 B2
(45) Date of Patent: Apr. 16, 2019

(54) STEERING-WHEEL FEEDBACK MECHANISM

(71) Applicants: Ford Global Technologies, LLC, Dearborn, MI (US); The Board of Trustees of the Leland Stanford Junior University, Stanford, CA (US)

(72) Inventors: Walter Joseph Talamonti, Dearborn, MI (US); Mishel Johns, Stanford, CA (US); Wendy Ju, Palo Alto, CA (US)

(73) Assignees: Ford Global Technologies, LLC, Dearborn, MI (US); The Board of Trustees of the Leland Stanford Junior University, Stanford, CA (US)

( * ) Notice: Subject to any disclaimer, the term of this patent is extended or adjusted under 35 U.S.C. 154(b) by 27 days.

(21) Appl. No.: 15/426,104

(22) Filed: Feb. 7, 2017

(65) Prior Publication Data

US 2018/0222524 A1    Aug. 9, 2018

(51) Int. Cl.
*B62D 6/02*     (2006.01)
*B62D 6/00*     (2006.01)
*B62D 15/02*    (2006.01)

(52) U.S. Cl.
CPC .............. *B62D 6/008* (2013.01); *B62D 15/02* (2013.01); *B62D 15/025* (2013.01)

(58) Field of Classification Search
CPC ......... B62D 6/02; B62D 6/008; B62D 15/021
See application file for complete search history.

(56) References Cited

U.S. PATENT DOCUMENTS

| 6,209,677 | B1 | 4/2001 | Bohner et al. |
| 7,510,038 | B2 | 3/2009 | Kaufmann et al. |
| 8,660,734 | B2 | 2/2014 | Zhu et al. |
| 8,994,521 | B2 | 3/2015 | Gazit |
| 2002/0092696 | A1 | 7/2002 | Bohner et al. |
| 2007/0198145 | A1 | 8/2007 | Norris et al. |
| 2007/0299582 | A1* | 12/2007 | Raksincharoensak ...................... B62D 6/003 701/41 |
| 2010/0211270 | A1* | 8/2010 | Chin ..................... B60W 40/09 701/44 |
| 2010/0228427 | A1 | 9/2010 | Anderson et al. |
| 2013/0090825 | A1 | 4/2013 | Park |
| 2015/0346724 | A1 | 12/2015 | Jones et al. |
| 2016/0200348 | A1 | 7/2016 | Lueke |

(Continued)

FOREIGN PATENT DOCUMENTS

| CN | 107336707 A | 11/2017 |
| CN | 108082185 A | 5/2018 |

(Continued)

OTHER PUBLICATIONS

GB Search Report dated Jul. 26, 2018 re GB Appl. No. 1801850.7.

(Continued)

*Primary Examiner* — Basil T. Jos
(74) *Attorney, Agent, or Firm* — Frank A. MacKenzie; Bejin Bieneman PLC

(57) ABSTRACT

A computer in a vehicle is programmed to change a steering angle of the vehicle and rotate a steering wheel of the vehicle to a steering-wheel angle based on the steering angle at a preset future time and a determined ratio of the steering-wheel angle to the steering angle. The determined ratio varies based at least on vehicle speed.

20 Claims, 3 Drawing Sheets

(56) References Cited

U.S. PATENT DOCUMENTS

| | | |
|---|---|---|
| 2016/0200358 A1 | 7/2016 | Pastor et al. |
| 2016/0207538 A1 | 7/2016 | Urano et al. |
| 2017/0203788 A1 | 7/2017 | Heo |
| 2017/0274928 A1 | 9/2017 | Minaki et al. |
| 2017/0297578 A1 | 10/2017 | Braun |
| 2018/0025645 A1 | 1/2018 | Schwindt et al. |
| 2018/0074497 A1 | 3/2018 | Tsuji et al. |
| 2018/0150074 A1 | 5/2018 | Hashimoto et al. |
| 2018/0178801 A1 | 6/2018 | Hashimoto et al. |
| 2018/0181132 A1 | 6/2018 | Kunihiro et al. |
| 2018/0194280 A1 | 7/2018 | Shibata et al. |
| 2018/0201306 A1 | 7/2018 | Tsubaki |

FOREIGN PATENT DOCUMENTS

| | | |
|---|---|---|
| DE | 102014107194 A1 | 11/2015 |
| DE | 102014220758 A1 | 4/2016 |
| EP | 1508495 A2 | 2/2005 |
| JP | 2000198458 A | 7/2000 |
| JP | 200575014 A | 3/2005 |
| WO | WO 2016023756 A1 | 2/2016 |

OTHER PUBLICATIONS

Non-Final Office Action dated Sep. 17, 2018 re U.S. Appl. No. 15/426,106, filed Feb. 7, 2017.
Non-Final Office Action dated Feb. 5, 2019 re U.S. Appl. No. 15/426,106, filed Feb. 7, 2017.

* cited by examiner

STEERING-WHEEL FEEDBACK MECHANISM

BACKGROUND

The Society of Automotive Engineers (SAE) has defined multiple levels of autonomous vehicle operation. At levels 0-2, a human driver monitors or controls the majority of the driving tasks, often with no help from the vehicle. At level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
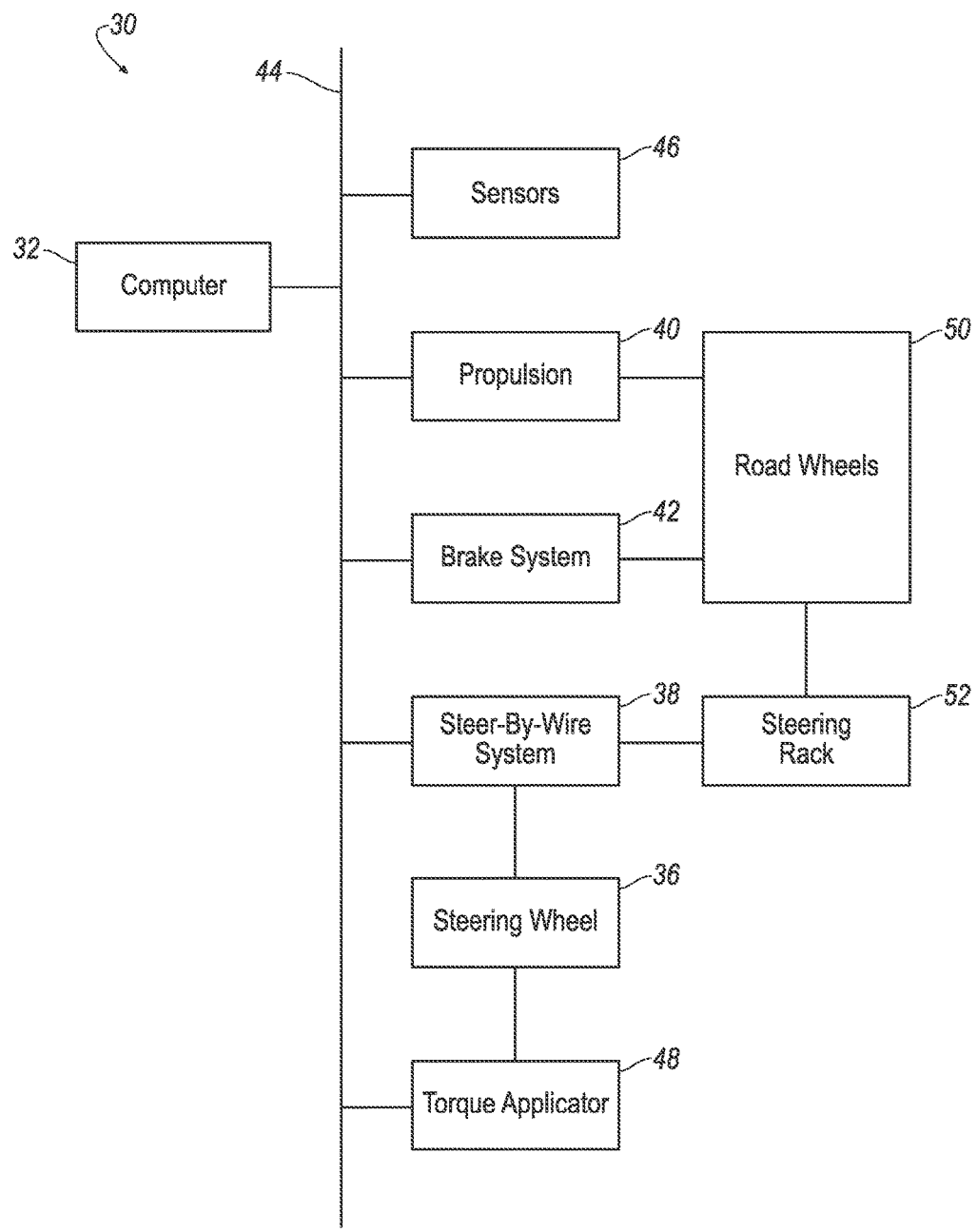
FIG. 1 is a block diagram of an exemplary vehicle.

With reference to the Figures, wherein like numerals indicate like parts throughout the several views, a computer 32 in a vehicle 30 is programmed to change a steering angle φ of the vehicle 30 and rotate a steering wheel 36 of the vehicle 30 to a steering-wheel angle θ based on the predicted or preset steering angle φ at a preset future time and a determined ratio R of the steering-wheel angle θ to the predicted or preset steering angle φ. The determined ratio R varies based at least on current vehicle speed.

The computer 32 as programmed uses the steering wheel 36 to provide easily understood and intuitive feedback to a human driver. The human driver may feel more comfortable when able to intuitively anticipate actions that the vehicle 30 will soon perform. If the vehicle 30 is operating semi-autonomously (as defined below), the computer 32 may provide the human driver time to react to change an action that the vehicle 30 is about to perform, which may reduce a likelihood of a vehicle impact.

The vehicle 30 may be an autonomous vehicle. The computer 32 may be capable of operating the vehicle 30 independently of the intervention of a human driver, completely or to a greater or a lesser degree. The computer 32 may be programmed to operate a propulsion system 40, brake system 42, steering system 34, and/or other vehicle systems.

For purposes of this disclosure, an autonomous mode is defined as one in which each of the propulsion system 40, the brake system 42, and the steering system 34 of the vehicle 30 are controlled by the computer 32; in a semi-autonomous mode the computer 32 of the vehicle 30 controls one or two of the propulsion system 40, the brake system 42, and the steering system 34. By way of context, the SAE has defined multiple levels of autonomous vehicle operation, as described in the Background. Thus, in one example, nonautonomous modes of operation according to the present disclosure may include levels 0-1, semi-autonomous modes of operation may include levels 2-3, and fully autonomous modes of operation may include levels 4-5.

With reference to FIG. 1, the computer 32 is included in the vehicle 30 for carrying out various operations, including as described herein. The computer 32 is a computing device that generally includes a processor and a memory, the memory including one or more forms of computer-readable media, and storing instructions executable by the processor for performing various operations, including as disclosed herein. The memory of the computer 32 further generally stores remote data received via various communications mechanisms; e.g., the computer 32 is generally configured for communications on a communications network 44 within the vehicle 30. The computer 32 may also have a connection to an onboard diagnostics connector (OBD-II). Although one computer 32 is shown in FIG. 1 for ease of illustration, it is to be understood that the computer 32 could include, and various operations described herein could be carried out by, one or more computing devices.

The computer 32 may transmit signals through the communications network 44, which may be a controller area network (CAN) bus, Ethernet, Local Interconnect Network (LIN), Bluetooth, and/or by any other wired or wireless communications network. The computer 32 may be in communication with sensors 46, the propulsion system 40, the brake system 42, and components of the steering system 34 such as a steer-by-wire system 38 and a torque applicator 48.

With continued reference to FIG. 1, the propulsion system 40 of the vehicle 30 generates energy and translates the energy into motion of the vehicle 30. The propulsion system 40 may be a known vehicle propulsion subsystem, for example, a powertrain including an internal-combustion engine coupled to a transmission that transfers rotational motion to road wheels 50; an electric powertrain including batteries, an electric motor, and a transmission that transfers rotational motion to the road wheels 50; a hybrid powertrain including elements of the conventional powertrain and the electric powertrain; or any other type of propulsion. The propulsion system 40 can include an electronic control unit (ECU) or the like that is in communication with and receives input from the computer 32 and/or a human driver. The human driver may control the propulsion system 40 via, e.g., an accelerator pedal and/or a gear-shift lever.

The brake system 42 is typically a known vehicle braking subsystem and resists the motion of the vehicle 30 to thereby slow and/or stop the vehicle 30, for example by resisting the rotation of the road wheels 50. The brake system 42 may be friction brakes such as disc brakes, drum brakes, band brakes, etc.; regenerative brakes; any other suitable type of brakes; or a combination. The brake system 42 can include an electronic control unit (ECU) or the like that is in communication with and receives input from the computer 32 and/or a human driver. The human driver may control the brake system 42 via, e.g., a brake pedal.

With continued reference to FIG. 1, the steering system 34 is typically a known vehicle steering subsystem and controls the turning of the road wheels 50. The steering system 34 may be a rack-and-pinion system with electric power-assisted steering, a system using steer-by-wire, as both are known, or any other suitable system. The steering system 34 can include an electronic control unit (ECU) or the like that is in communication with and receives input from the computer 32 and/or a human driver. The steering system 34 may include the steering wheel 36 by which the human driver may control the steering system 34. For a steering system 34 using steer-by-wire, the steering system 34 may include a steering rack 52 coupled to the road wheels 50, the steer-by-wire system 38, the steering wheel 36, and the torque applicator 48.

Figure 2:
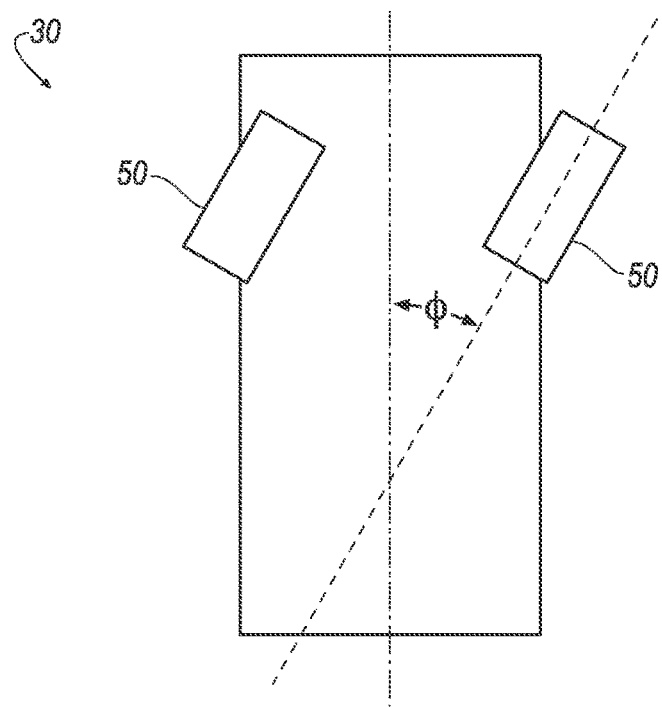
FIG. 2 is a top view of the vehicle of FIG. 1.

The steering rack 52 is connected to the steer-by-wire system 38, and the steering rack 52 is coupled to the road wheels 50. The steering rack 52 may be connected to the steer-by-wire system 38 via, e.g., electromechanical actuators (not shown) that transform an electrical signal into mechanical motion of the steering rack 52. The position of the steering rack 52 determines the turning of the road wheels 50. As shown in FIG. 2, the road wheels 50 have a steering angle $\varphi$, that is, an angle that the road wheels 50 are turned relative to the rest of the vehicle 30. The steering angle $\varphi$ may be measured relative to a vehicle-forward direction. For example, when the road wheels 50 are turned straight forward, the steering angle $\varphi$ is zero; when the road wheels 50 are turned to the right, the steering angle $\varphi$ has a positive value; and when the road wheels 50 are turned to the left, the steering angle $\varphi$ has a negative value.

The steer-by-wire system 38 may be connected to the steering rack 52 as described and connected to the steering wheel 36. The steer-by-wire system 38 may include a wiring harness and the ECU (not shown) in communication with the steering rack 52 and the steering wheel 36. In other words, there is no mechanical connection between the steering wheel 36 and the steering rack 52, only an electrical or electronic connection.

Figure 3:
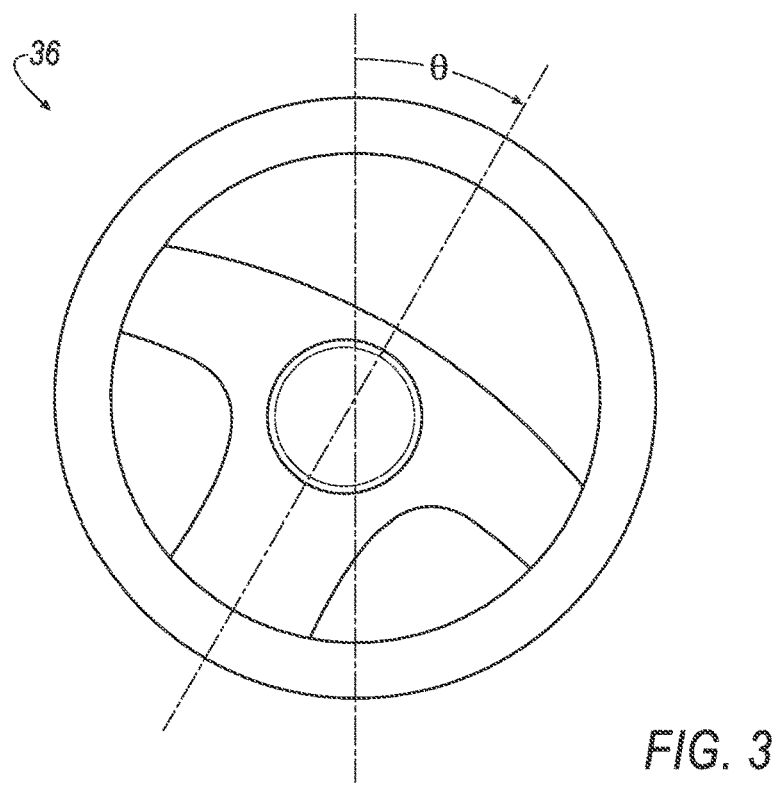
FIG. 3 is a front view of a steering wheel of the vehicle of FIG. 1.

The steering wheel 36 may be rotatably coupled to an instrument panel (not shown) facing a seat for a human driver. As shown in FIG. 3, the steering wheel 36 has a steering-wheel angle $\theta$. The steering-wheel angle $\theta$ may be measured relative to a reference angle, such as when the steering wheel 36 is centered. For example, when the steering wheel 36 is centered, the steering-wheel angle $\theta$ is zero; when the steering wheel 36 is rotated to the right, the steering-wheel angle $\theta$ has a positive value; and when the steering wheel 36 is rotated to the left, the steering-wheel angle $\theta$ has a negative value. The steer-by-wire system 38 may detect the steering-wheel angle $\theta$ via a position sensor (not shown), e.g., a Hall effect sensor, a rotary encoder, etc.

The torque applicator 48 is in communication with the computer 32 and coupled to the steering wheel 36, e.g., via a steering column (not shown). The torque applicator 48 may apply a torque T to the steering wheel 36, causing or resisting rotation of the steering wheel 36. The torque T applied by the torque applicator 48 is variable, and the computer 32 may instruct the torque applicator 48 to apply a particular level of torque T to the steering wheel 36. The torque applicator 48 may be, for example, an electric motor.

With continued reference to FIG. 1, the vehicle 30 may include the sensors 46. The sensors 46 may detect internal states of the vehicle 30, for example, wheel speed, wheel orientation, and engine and transmission variables. The sensors 46 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world; for example, the sensors 46 can include one or more of radar sensors, scanning laser range finders, light detection and ranging (LIDAR) devices, and image processing sensors such as cameras. The sensors 46 may include communications devices, for example, vehicle-to-infrastructure (V2I) or vehicle-to-vehicle (V2V) devices.

Figure 4:
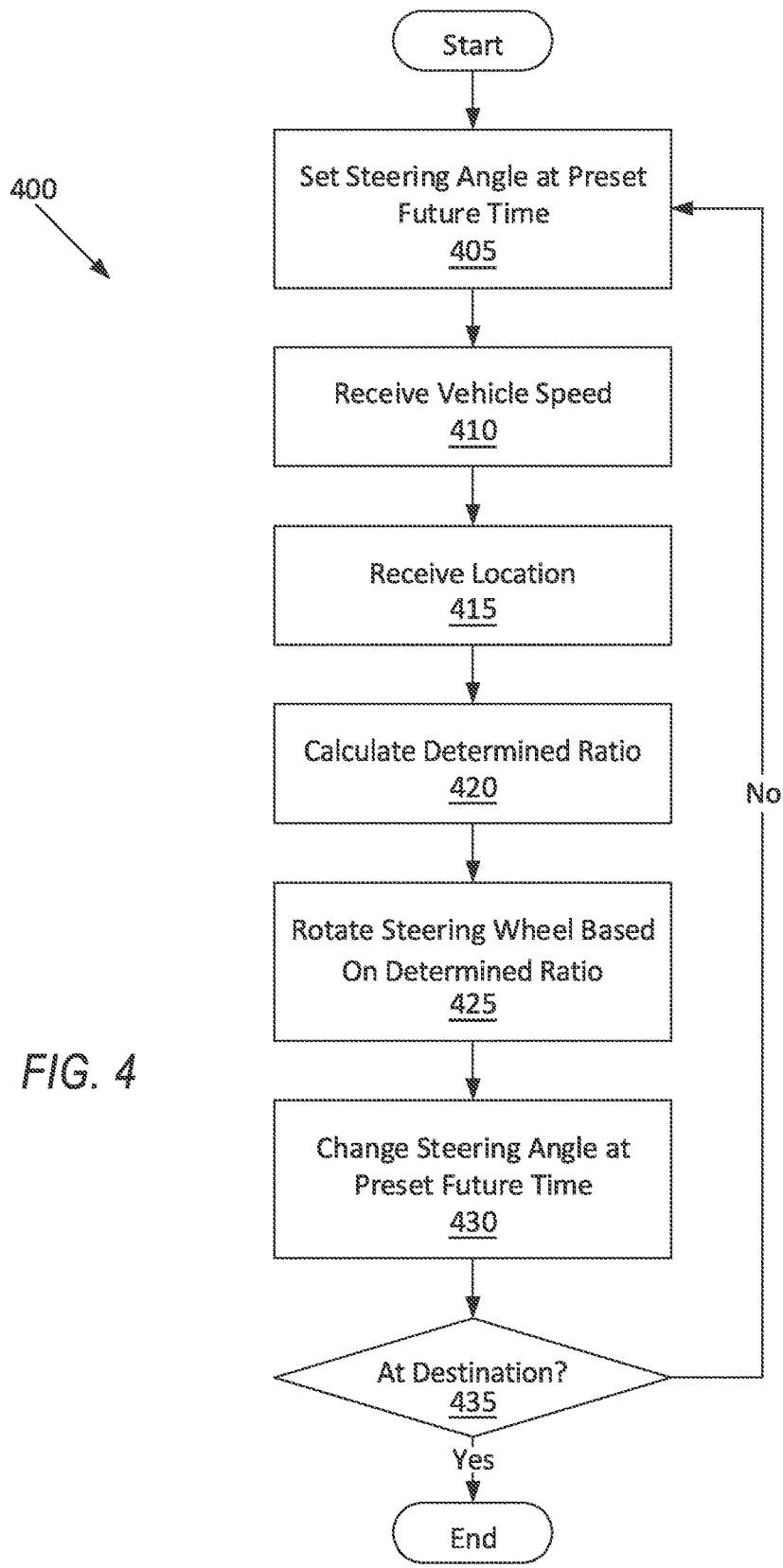
FIG. 4 is a process flow diagram of an exemplary process for controlling the steering wheel of the vehicle of FIG. 1.

FIG. 4 is a process flow diagram illustrating an exemplary process 400 for controlling the steering wheel 36 of the vehicle 30. The computer 32 may be programmed with the steps of the process 400. The process 400 may be used to provide feedback to a human driver. The computer 32 may use the process 400 when the vehicle 30 is operating fully autonomously, or when the vehicle 30 is operating semi-autonomously.

The process 400 begins in a block 405, in which the computer 32 sets the steering angle $\varphi$ for a preset future time. For example, the computer 32 may provide the steering angle $\varphi$ for a specified future time as output from the programming conventionally used for autonomous or semi-autonomous operation of the vehicle 30. The preset future time may be a predetermined time $\Delta t$ from a present time $t_0$, that is, $t_0 + \Delta t$, e.g., two seconds in the future. The preset future time may be chosen to be sufficiently short such that rotation of the steering wheel 36, described below regarding a block 425, is intuitively associated with a change in steering angle $\varphi$ of the vehicle 30 that would be made by a human driver. Additionally or alternatively, the preset future time may be chosen by a system designer to be sufficiently long so that the human driver may have time to react to the rotation of the steering wheel 36 before the change in steering angle $\varphi$ of the vehicle 30.

Next, in a block 410, the computer 32 receives a vehicle speed, for example, from one or more sensors 46 or from an odometer.

Next, in a block 415, the computer 32 identifies a roadway type on which the vehicle 30 is traveling. The computer 32 may use location data such as GPS data from the sensors 46 combined with map data to identify a road on which the vehicle 30 is currently located. The computer 32 may use map data to classify the road. Possible roadway types include controlled-access highway, e.g., interstate highway, freeway, tollway, etc.; and noncontrolled-access road, e.g., county highways, local roads, etc. A controlled-access highway for purposes of this disclosure means a highway that is designed for continuous (nonstopping absent a traffic jam) traffic flow and therefore does not have stop-lights or stop-signs. For example, a controlled-access highway can be accessed only by entrance and exits ramps that allow vehicles to merge onto the highway and/or exit without stopping or substantially slowing until on the ramp. A noncontrolled-access road, in contrast, is designed for traffic to stop and start and can be accessed by vehicles turning onto and off of the road, possibly from a stop. A noncontrolled-access road may have stoplights and/or stop-signs.

Next, in a block 420, the computer 32 calculates a determined ratio R. The determined ratio R is used below in the block 425 as the ratio of the steering-wheel angle $\theta$ to the steering angle $\varphi$ at the preset future time, for example, $R = \theta(t_0)/\varphi(t_0 + \Delta t)$. The determined ratio R varies based at least on the vehicle speed and may also vary based on the roadway type, that is, R(v,h), in which v is current vehicle speed and h is current roadway type. For example, the determined ratio R may be higher at a first vehicle speed than at a second, slower vehicle speed. More specifically, the determined ratio R may increase as the vehicle speed increases and may increase monotonically, that is, without decreasing, as the vehicle speed increases. The determined ratio R may be higher for a controlled-access highway than for a noncontrolled-access road. More specifically, the determined ratio R may be higher at a given speed for a controlled-access highway than for a noncontrolled-access road.

Next, in the block 425, the computer 32 rotates the steering wheel 36 to a steering-wheel angle θ based on the steering angle φ at the preset future time and the determined ratio R. In particular, the steering wheel 36 is rotated to the steering-wheel angle θ equal to the steering angle φ at the preset future time multiplied by the determined ratio R, $\theta(t_0) = R(v,h) \cdot \varphi(t_0 + \Delta t)$.

Next, in a block 430, the computer 32 changes the steering angle φ of the vehicle 30 by turning the road wheels 50 at the preset future time $t_0 + \Delta t$.

Next, in a decision block 435, the computer 32 determines whether the vehicle 30 has arrived at its destination or has been switched out of the fully autonomous mode or semi-autonomous mode to the nonautonomous mode, in other words, the computer 32 determines whether a situation has occurred that means that the computer 32 should no longer perform the process 400. If the vehicle 30 has not arrived at its destination, etc., then the process 400 proceeds back to the block 405 to begin again; that is, the process 400 continues continuously while the vehicle 30 is operating autonomously or semi-autonomously. If the vehicle 30 has arrived at its destination, etc., the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer, programmed to:
   set a steering angle of a vehicle at a present time for a preset future time; and
   before the preset future time, rotate a steering wheel to a steering-wheel angle based on the steering angle for the preset future time and a determined ratio of the steering-wheel angle to the steering angle;
   wherein the determined ratio varies based at least on a vehicle speed.

2. The computer of claim 1, wherein the determined ratio is higher at a first vehicle speed than at a second vehicle speed, the first vehicle speed being faster than the second vehicle speed.

3. The computer of claim 1, wherein the determined ratio increases as the vehicle speed increases.

4. The computer of claim 3, wherein the determined ratio increases monotonically as the vehicle speed increases.

5. The computer of claim 1, wherein the determined ratio is based on a roadway type.

6. The computer of claim 5, wherein the roadway type is one of a controlled-access highway and a noncontrolled-access road.

7. The computer of claim 6, wherein the determined ratio is higher for the controlled-access highway than for the noncontrolled-access road.

8. A method comprising:
   setting a steering angle of a vehicle at a present time for a preset future time; and
   before the preset future time, rotating a steering wheel to a steering-wheel angle based on the steering angle for the preset future time and a determined ratio of the steering-wheel angle to the steering angle;
   wherein the determined ratio varies based at least on a vehicle speed.

9. The method of claim 8, wherein the determined ratio is higher at a first vehicle speed than at a second vehicle speed, the first vehicle speed being faster than the second vehicle speed.

10. The method of claim 8, wherein the determined ratio increases as the vehicle speed increases.

11. The method of claim 10, wherein the determined ratio increases monotonically as the vehicle speed increases.

12. The method of claim 8, wherein the determined ratio is based on a roadway type.

13. The method of claim 12, wherein the roadway type is one of a controlled-access highway and a noncontrolled-access road.

14. The method of claim 13, wherein the determined ratio is higher for the controlled-access highway than for the noncontrolled-access road.

15. A steering system comprising:
   a steering wheel having a steering-wheel angle;
   a steer-by-wire system connected to the steering wheel; and
   a computer in communication with the steer-by-wire system and programmed to change set a steering angle at a present time for a preset future time; and before the preset future time, rotate the steering wheel based on the steering angle for the preset future time and a determined ratio of the steering-wheel angle to the steering angle, the determined ratio based on a vehicle speed.

16. The steering system of claim 15, further comprising a steering rack connected to the steer-by-wire system, the steering rack coupleable to road wheels having the steering angle.

17. The steering system of claim 15, wherein the determined ratio increases as the vehicle speed increases.

18. The steering system of claim 17, wherein the determined ratio increases monotonically as the vehicle speed increases.

19. The steering system of claim 15, wherein the determined ratio is based on a roadway type.

20. The steering system of claim 19, wherein the determined ratio is higher for a roadway type of controlled-access highway than for a roadway type of noncontrolled-access road.

* * * * *